United States Patent [19]

Beere

[11] Patent Number: 5,249,815
[45] Date of Patent: Oct. 5, 1993

[54] COLLET CLAMPING MECHANISM

[75] Inventor: Richard F. Beere, Waterford, Wis.

[73] Assignee: Beere Tool Company, Inc., Racine, Wis.

[21] Appl. No.: 867,487

[22] Filed: Apr. 13, 1992

[51] Int. Cl.$^5$ .............................................. B23B 31/30
[52] U.S. Cl. ...................................... 279/4.04; 279/50
[58] Field of Search ................ 279/43, 50, 57, 4.04; 409/223

[56] References Cited

U.S. PATENT DOCUMENTS

| 809,296 | 1/1906 | Gordon . | |
| 2,393,458 | 1/1946 | Cook | 279/4 |
| 2,466,651 | 4/1949 | Zagar | 279/50 |
| 2,479,973 | 8/1949 | Scott et al. | 279/65 |
| 2,562,455 | 7/1951 | Gridley | 279/46 |
| 3,087,736 | 4/1963 | Lukas | 279/4 |
| 3,257,538 | 6/1966 | Hogle et al. | 279/50 X |
| 3,632,122 | 1/1972 | Sessody | 279/4 |
| 3,751,027 | 8/1973 | Giles | 279/43 X |
| 3,791,661 | 2/1974 | Giles | 279/43 |
| 4,614,469 | 9/1986 | Beere | 409/219 |
| 5,110,146 | 5/1992 | Beere | 279/43 |

FOREIGN PATENT DOCUMENTS 345182 12/1921 Fed. Rep. of Germany ........ 279/50
2379351 10/1978 France .

Primary Examiner—Timothy V. Eley
Attorney, Agent, or Firm—Arthur J. Hansmann

[57] ABSTRACT

A collet clamping mechanism having a sleeve with shoulders thereon, and an actuator for forcing against the shoulders for clamping a workpiece in the collet.

16 Claims, 1 Drawing Sheet

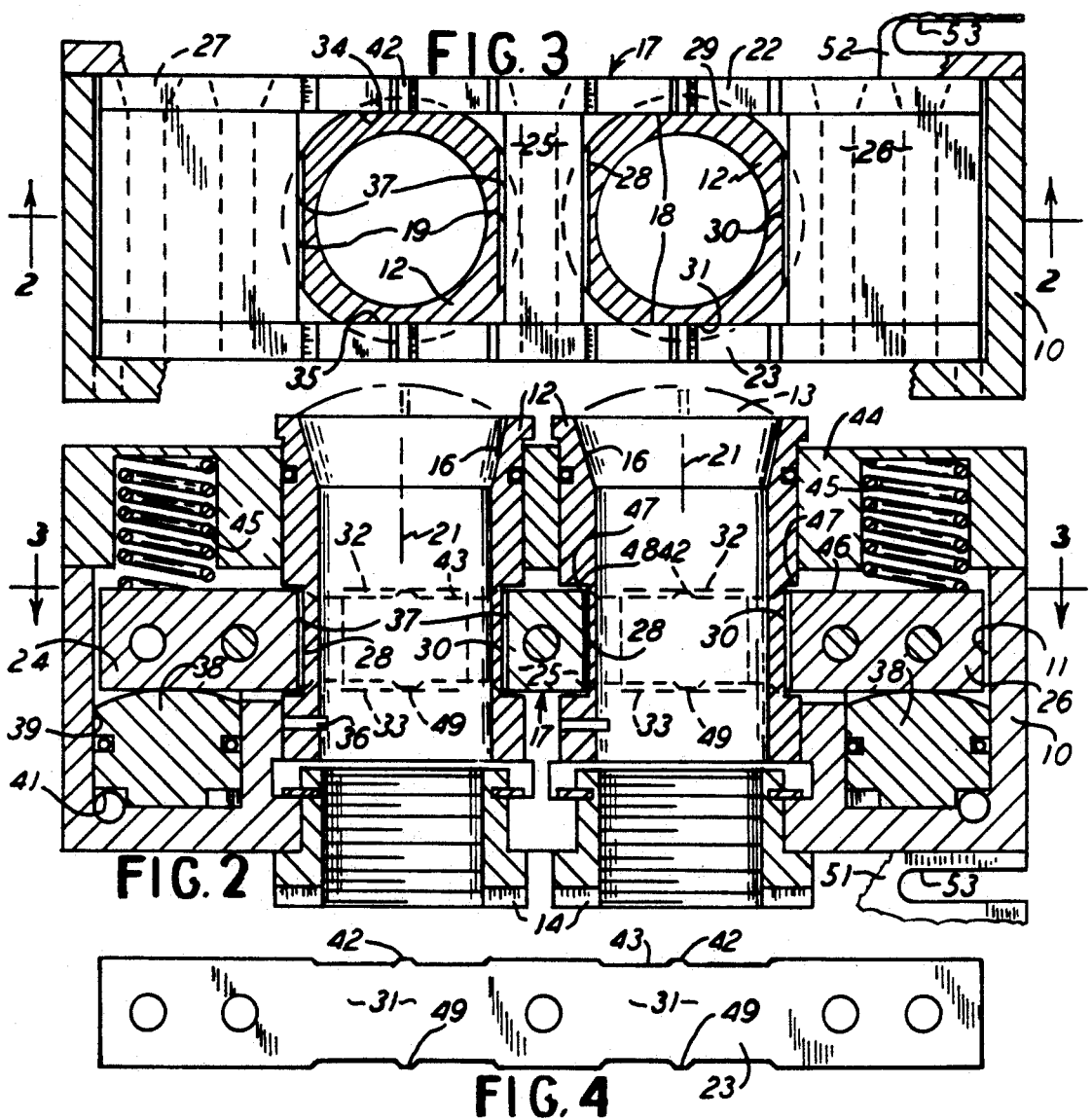

COLLET CLAMPING MECHANISM

This invention relates to a collet clamping mechanism of the type which can clamp a standard collet and the workpiece held therein.

BACKGROUND OF THE INVENTION

The prior art is already aware of various mechanisms for clamping collets. Examples of the prior art are found in U.S. Pat. Nos. 809,296; 2,393,458; 2,466,651; 2,479,973; 2,562,455; 3,087,736; 3,632,122; 3,791,661; 4,614,469 and French Patent 2,379,351. These patents all show chucks or collet clamping arrangements, all for securing a workpiece to be worked upon. The function of these collets or chucks is to readily and securely clamp a workpiece so that the workpiece can be machined or the like.

The present invention differs over the prior art in that it provides a collet wherein the clamping force is precisely and uniformly applied to the collet so that the workpiece is accurately positioned and securely fixed. In actuality, the present mechanism applies full power of two actuating pistons which apply clamping force on diametrically opposite sides of a clamping sleeve. There is no binding or cocking of the moving and clamping parts, and the pistons are on the plane of clamping force. Further, there is four-sided guiding of the clamping mechanism which is arranged so that it can be accurately machined and ground to be square and accurate. Also, only two of the clamping parts need be heat treated to present the optimum mechanism in accuracy and strength.

Further, the activator utilized for the clamping action also restrains a sleeve, and thus the collet, from rotation to thereby, and again, accurately position the workpiece and affix it in that position.

Still further, the mechanism of this invention is arranged to be applied to two sets of collets and sleeves, and both sets can be activated simultaneously and thus two workpieces can be simultaneously clamped. Still further, the actuator is arranged so that it operates on the two sets in a manner wherein even two different diameters of workpieces can be simultaneously restrained in the two sets. That is, the one set can be displaced a greater amount than the other set to accommodate the clamping of the workpieces of the two different diameters and to do so simultaneously, all off one actuator and one application of clamping force. This is all achieved with a minimal of parts which are configured and related to each other so that they can be easily and accurately machined for the assembly and the features mentioned above.

BRIEF DESCRIPTION OF THE DRAWINGS

FIG. 1 is a top plan view of a portion of the mechanism, showing the plurality of collets.

FIG. 2 is an enlarged sectional view taken along the line 2—2 of FIG. 1, and of FIG. 3.

FIG. 3 is a sectional view taken along the line 3—3 of FIG. 2.

FIG. 4 is a side elevational view of a part shown in FIGS. 2 and 3.

FIG. 5 is a side elevational view of parts shown in FIG. 2.

FIG. 6 is a side elevational view of FIG. 5.

DETAILED DESCRIPTION OF THE PREFERRED EMBODIMENT

My U.S. Pat. No. 4,614,469 shows a multiple collet work-piece holder wherein a plurality of collets are disposed and clamped onto respective workpieces. Further, U.S. Pat. No. 2,466,651 shows a collet holder wherein the collet is affixed relative to a holder and a sleeve moves over the outside of the collet for causing the collet to clamp onto a workpiece. The present invention utilizes the aforesaid aspects of those two patents in that it shows a holder or body 10 having a central opening 11 and it has axially movable sleeves 12 disposed within the opening 11, and each sleeve 12 receives a standard collet 13, shown in dot-dash lines. Further, it will be understood that the collets 13 are affixed, relative to the holder 10, with regard to movement along the longitudinal axes of the collets 13, as in the aforesaid patents and as is well known by anyone skilled in the art. Thus, the lower ends of the collets 13, relative to the view of FIG. 2, would normally thread into the nuts 14 affixed to the body 10, all for the longitudinal affixing of the collets 13 relative to the body 10, as mentioned. Of course the sleeves 12 and the collets 13 have matching frusto-conical surfaces 16 along which the sleeves 12 will slide, such as upwardly as viewed in FIG. 2, and thereby create the customary clamping action of the upper ends or heads of the collet 13 onto the workpieces which would be held in the collet 13.

The aforementioned is all conventional and should be readily understood by anyone skilled in the art.

FIG. 1 shows the top view of the body 10 with the plurality of sleeves 12 shown in two side-by-side rows to present the pairs of sleeves 12 which are actually activated simultaneously, such as by the hydraulic system hereinafter described.

Particularly FIGS. 2 and 3 show an activator, generally designated 17, which surrounds the sleeves 12 on all four sides of the sleeves 12 and thus extends with activator surfaces, such as the two diametrically opposite surfaces 18 and the two diametrically opposite surfaces 19, which extend respectively tangentially of the respective sleeves 12. As such, the sleeves 12 are captured by the activator 17, and thus the sleeves can be moved along their respective longitudinal axes designated 21 when the activator 17 is moved up and down, as viewed in FIG. 2.

The activator 17 includes two parallel side rails 22 and 23 and three spacer members 24, 25, and 26 which extend between the rails 22 and 23 and are suitably screwed thereto, as shown by the screws 27 extending across the activator 17. The activator is of course centrally located in the body opening 11, as shown in FIG. 2, and the drawings also show that each sleeve 12 has four planar or flat cut-outs 28, 29, 30, and 31, each of which presents the respective flat surface at the base of the respective cut-out and each of which presents an upper shoulder 32 and a lower shoulder 33 at the terminal ends of each of the base surfaces of the respective cut-outs.

FIGS. 3 and 5 show that the sleeve planar surfaces 29 and 31 are in flat and snug contact with the inner planar surfaces 34 and 35 of the respective rails 22 and 23. In that arrangement, the activator rails 22 and 23 are in constant contact with the planar surfaces 29 and 31 of the respective sleeves 12 and thus retain the sleeves 12 against rotation about the longitudinal axes of the sleeves 12 so that the working force can be applied to the workpiece held in the collets 13 but without any rotation of the collets 13 because the sleeves 12 are held against rotation and are held non-rotatably with the collets 13 by means of the inter-engaged pins 36. Also, under certain conditions of activation of the activator 17, as hereinafter described, planar surfaces 37 of the activator spacers 24 and 25 and 26, will contact the adjacent planar surfaces 28 and 30 of the respective sleeves 12 to further restrain the sleeves 12 and the collets 13 against that rotation.

That is, each sleeve 12 has four cut-outs in the quarter segments thereof, to present planar surfaces exteriorly of the sleeves 12 and to receive the adjacent planar surface of the activator 17, to thus restrain the sleeves 12 and the collets 13 against rotation about the longitudinal axes.

Accordingly, there is one activator 17 for each pair of sleeves 12, and there is also a respective activator force-applying means for each activator 17. Such means is shown to include two fluid pistons 38 which are located in contact with the opposite ends of the activator 17, as seen in FIG. 2, and the pistons are of course slidable in cylinders 39 formed in the housing 10. Fluid lines, such as a hydraulic line 41, extends in the housing 10 and to the base of each piston 38 to force upwardly on each piston 38 and thus force upwardly on the opposite ends of the activator 17, such as at the activator spacers 24 and 26. In response, the activator 17 is moved upwardly, and it forces against the upper shoulders 32 on diametrically opposite sides of each sleeve 12 and which are seen in FIGS. 2, 5, and 6. Of course upward movement of the sleeves 12, with the affixation of the collets 13, causes the sleeves 12 to clamp onto the collets 13 which in turn clamp on to the workpiece held therewithin, all as desired. The specific portion of the activator 17 which contacts the sleeve shoulders 32 is a protrusion or tang 42 which extends above the upper surface 43 of each side rail 22 and 23 and which is of a length, such as most clearly shown in FIG. 6, to be less than one-half the length of each shoulder 32, as seen in FIG. 6. In that regard, the tangs 42 provide essentially a point contact, or at least a very narrow contact, on the shoulders 32 in forcing upwardly on the respective sleeves 12, and to thereby avoid any topping or cocking of the sleeves 12 such as might occur if the entire upper surface of each rail 22 and 23 adjacent the upper shoulder 32 were in contact with the shoulder 32. Further, the fact that each rail has its tang 42 on diametrically opposite sides of each sleeve 12 provides for the uniform upward forcing on each sleeve 12 to again assure accurate upward displacement of the sleeve 12 in the clamping action and to avoid any binding or tipping action. Also, only the rails 22 and 23 need to be treated, in order to provide for precision and long wear. Still further, with the pistons 38 at each end of each activator 17, there is again balancing of the activating force, namely, on each end of the activator 17, rather than a cantilevered type of force to only one side of the activator 17, and thus there can be precision and uniformity in applying the clamping force to the sleeves 12; pistons 38 being equally forced.

FIG. 2 also shows that there is a compression spring 45 nested in opposite ends of an upper body piece 44 which is suitably bolted to the main body 10, and the springs 45 are available for pressing downwardly on the opposite ends of the activator 17 when pressure is released relative to the pistons 38 and that is when it is desired that the sleeves 12 be lowered to release the clamping force applied by the collets 13.

An additional feature is that the two collets 13 can hold different sizes of workpieces at the same time. For instance, if there is a larger size diameter workpiece in the lefthand collet 13, as viewed in FIG. 2, then fluid force on the piston 38 would raise the left end of the activator 17 until the full clamping action would be applied on the workpiece in the lefthand collet 13. However, the righthand collet 13 would not yet be clamping its smaller diameter workpiece until its sleeve 12 was raised a sufficient amount to create full clamping. This variation is possible by virtue of the fact that the righthand end of the actuator 17, as viewed in FIG. 2, can then rise higher than the lefthand end of the actuator 17, and this is possible because the three spacers 24, 25, and 26, are with a slight clearance relative to the respective sleeve cut-out surfaces 28 and 30 to thereby allow the heretofore described tipping or tilting action of the actuator 17 for producing the full clamping on each of the pair of collets 13. However, in that action, the spaced-away spacer surfaces 37 could actually have their ends come into contact with the respective sleeve surfaces 28 and 30 to thereby restrain the longitudinal rotation. Still further, the upper surface 46 of the spacer 26 could contact the upper shoulder 47 of the sleeve cut-out 30. Further, depending upon the amount of tilt of actuator 17, the upper surface 48 of the spacer 25 could contact the other shoulder 47 of the sleeve 12 and on the diametrically opposite side of the sleeve 12.

However, it will be seen and understood that the upper shoulders 32 are on a plane offset from the upper shoulders 47 which are actually higher, as viewed in FIG. 2, all to assure that the primary clamping force is produced through the tangs 42 on the shoulders 32 while the spacers 24, 25, and 26 remain spaced away from the upper shoulders 47 unless and until the occurrence of the clamping action just described.

Further, each rail 22 and 23 has an additional tang 49 on the underside thereof, as viewed in FIGS. 2 and 4 and 6, and the tangs 49 are available for pressing downwardly on the shoulders 33 in which the tangs 49 are in contact. Of course the downward force on the shoulders 33 cause the sleeves 12 to move downwardly and thereby release the clamping force on the collets 13, and that action is created under the force of the compression springs 45. Again, the length of the tangs 49, as viewed in these drawings, is less than half of the length of the shoulders 33, and thus there is no binding when the release force is being applied to the actuator 17.

Still further, the actuator 17 is made of basically two types of parts, namely the rails 22 and 23 and the spacers 24, 25, and 26. In that manner, the rails 22 and 23 can be readily separately heat treated without requiring heat treatment of all other parts or a larger piece, and also the respective contacting surfaces which have been described relative to the rails 22 and 23 and the three spacers and the sleeve 12 can all be easily machined and properly ground or otherwise formed for the precision inherent herein.

Still further, the body 10 can have flanges 51 and 52 which include screw slots 53 for clamping the body 10 to a workbench or the like and to do so in both the horizontal and vertical orientation.

It will therefore be seen and understood that the upper shoulders 32 on diametrically opposite sides of each sleeve 12 are on the same plane, and likewise the upper shoulders 47 are on the same plane but the plane different from that of the plane of the shoulders 32, as shown in FIG. 5, for instance. Also, the force-applying tangs 42 are only at the mid-lengths of the shoulders 32 with which the tangs 42 are in contact.

What is claimed is:

1. In a collet clamping mechanism for clamping a collet, a collet of the type having a tapered clamp surface, a sleeve having a longitudinal axis and an elongated opening along said axis for receiving said collet and having a tapered surface positionable into contact with said collet clamp surface, said sleeve having shoulders with surfaces respectively facing in each respective direction parallel to said longitudinal axis and with said shoulders being disposed in pairs facing each other and located in respective positions around said sleeve, a base member having an opening therein, said sleeve with said collet disposed within said base member opening and leaving a space between said sleeve and said base member to define an actuator space, and said collet being connected to said base member to restrict movement of said collet relative to said base member and along said longitudinal axis, the improvement comprising an actuator disposed within said base member actuator space and being engageable with said pairs of shoulders and being smaller than said actuator space for actuating movement through said actuator space in both directions of said longitudinal axis, said actuator being constructed of four parts, and a first two of said four parts two spaced-apart walls and the other two of said four parts being planar shaped and connected to the first said two parts and spanning said spaced-apart walls for presenting a complete enclosure for said sleeve, said actuator being arranged to have different ones of said four parts engageable with different ones of said shoulders for forcefully and uniformly pressing on said shoulders of said sleeve, and force-applying means operatively connected with said actuator for the clamping movement of said actuator.

2. The collet clamping mechanism as claimed in claim 1 wherein said pairs of shoulders are on diametrically opposite sides of said sleeve.

3. The collet clamping mechanism as claimed in claim 2, wherein said sleeve has a planar surface extending between each two of said shoulders which form each pair of said shoulders, and said actuator has a respective planar surface in contact with each of said planar surfaces of said sleeve for restraining said sleeve.

4. The collet clamping mechanism as claimed in claim 3, wherein said sleeve planar surfaces are in pairs on diametrically opposite sides of said sleeve and said pairs of surfaces are parallel to each other.

5. The collet clamping mechanism as claimed in claim 2, wherein said shoulders are planar and are on common planes extending transverse to said longitudinal axis along said opposite sides of said sleeve.

6. In a collet clamping mechanism, a collet, a base member having an opening for receiving said collet, a connector anchoring said collet to said base member, a cylindrical sleeve in said base member and surrounding said collet and having an elongated axis, an actuator movably disposed in said base member and in contact with said sleeve for moving said sleeve relative to said anchored collet to effect clamping movement, means operative on said actuator for clamping movement of said actuator, said sleeve and said actuator together presenting a first set of surfaces disposed for contact therebetween and consequent clamping movement of said sleeve along said elongated axis and relative to said collet in response to clamping movement of said actuator, said first set of surfaces being disposed at first ones of diametrically opposite sides of said sleeve and arranged for transfer of clamping forces from said actuator to said sleeve, the improvement comprising said sleeve and said actuator having a second set of surfaces at diametrically opposite sides spaced from said first ones of diametrically opposite sides of said sleeve and with said second set of surfaces being disposed in planes parallel to each other and being matched together and arranged for snug engagement therebetween and consequent restraint of said sleeve relative to said actuator to restrict any rotation of said sleeve, said actuator also being comprised of multiple parts connected together and in snug contact with said sleeve and with each of said parts presenting some of said surfaces of said first and said second sets of surfaces, the two of said parts then being planar bars extending tangentially relative to said sleeve, and each of said two parts includes extension of a protruding tang, and said surfaces of said first set of surfaces of said actuator each are on a respective said tang for uniform forcing on said surface of said first set of surfaces on said sleeve.

7. A collet clamping mechanism comprising a base member having an opening therein, a pair of sleeves disposed in said opening in side-by-side positioning and each having an elongated axis parallel to each other and having diametrically opposite parallel sides, a collet disposed in each of said sleeves and being anchored to said base member, a single actuator disposed in said opening and extending tangentially to each of said sleeves and being in contact with said diametrically opposite parallel sides of each of said sleeves for preventing rotation of said sleeves about said longitudinal axes, means operative on said actuator for collet-clamping movement of said actuator, said sleeves and said actuator both having mutual contacting surfaces faced in the directions of said longitudinal axes for applying the movement of said actuator to said sleeves.

8. The collet clamping mechanism as claimed in claim 7, wherein said contacting surfaces on said sleeves are planar extending shoulders extending for a length across said sleeves, and said contacting surfaces on said actuator are tangs extending into respective contact with said shoulders at only the mid-length of said shoulders.

9. The collet clamping mechanism as claimed in claim 8, wherein each said sleeve and said actuator have force-transmitting surfaces facing each other and being faced in the directions of said longitudinal axes and being at a location spaced between said diametrically opposite parallel sides, said force-transmitting surfaces being arranged to transmit the clamping force of said actuator to said sleeves in addition to the force applied by said mutual contacting surfaces.

10. The collet clamping mechanism as claimed in claim 9, wherein said force-transmitting surfaces are spaced apart until said actuator is moved sufficiently to effect contact between said force-transmitting surfaces.

11. In a collet clamping mechanism, a collet, a base member having an opening for receiving said collet, a connector anchoring said collet to said base member, a cylindrical sleeve in said base member and surrounding said collet and having an elongated axis, an actuator movably disposed in said base member and in contact with said sleeve for moving said sleeve relative to said anchored collet to effect clamping movement, means operative on said actuator for clamping movement of said actuator, said sleeve and said actuator together presenting a first set of surfaces disposed for contact therebetween and consequent clamping movement of said sleeve along said elongated axis and relative to said collet in response to clamping movement of said actuator, said first set of surfaces being disposed at first ones of diametrically opposite sides of said sleeve and arranged for transfer of clamping forces from said actuator to said sleeve, the improvement comprising said sleeve and said actuator having a second set of surfaces at diametrically opposite sides spaced from said first ones of diametrically opposite sides of said sleeve and with said second set of surfaces being disposed in planes parallel to each other and being matched together and arranged for snug engagement therebetween and consequent restraint of said sleeve relative to said actuator to restrict any rotation of said sleeve, said actuator being comprised of multiple parts connected together and in snug contact with said sleeve and with each of said parts presenting some of said surfaces of said first and said second sets of surfaces, said actuator being shaped to present a rectangular space around said sleeve at said second set of surfaces of said sleeve, and said actuator thereby presents rectangularly related surfaces to said sleeve for restraining rotation of said sleeve about said longitudinal axis.

12. In a collet clamping mechanism, a collet, a base member having an opening for receiving said collet, a connector anchoring said collet to said base member, a cylindrical sleeve in said base member and surrounding said collet and having an elongated axis, an actuator movably disposed in said base member and in contact with said sleeve for moving said sleeve relative to said anchored collet to effect clamping movement, means operative on said actuator for clamping movement of said actuator, said sleeve and said actuator together presenting a first set of surfaces disposed for contact therebetween and consequent clamping movement of said sleeve along said elongated axis and relative to said collet in response to clamping movement of said actuator, said first set of surfaces being disposed at first ones of diametrically opposite sides of said sleeve and arranged for transfer of clamping forces from said actuator to said sleeve, the improvement comprising said sleeve and said actuator having a second set of surfaces at diametrically opposite sides spaced from said first ones of diametricasly opposite sides of said sleeve and with said second set of surfaces being disposed in planes parallel to each other and being then matched together and arranged for snug engagement therebetween and consequent restraint of said sleeve relative to said actuator to restrict any rotation of said sleeve, said actuator being comprised of multiple parts connected together and in snug contact with said sleeve and with each of said parts presenting some of said surfaces of said first and said second sets of surfaces, two of said parts being planar bars extending tangentially relative to said sleeve, and said actuator parts being shaped to present a rectangular space around said sleeve at the location of said second set of surfaces of said sleeve, and said actuator thereby has planar surfaces in contact with said sleeve for restraining rotation of said sleeve about said longitudinal axis.

13. In a collet clamping mechanism, a collet, a base member having an opening for receiving said collet, a connector anchoring said collet to said base member, a cylindrical sleeve in said base member and surrounding said collet and having an elongated axis, an actuator movably disposed in said base member an din contact with said sleeve for moving said sleeve relative to said anchored collet to effect clamping movement, means operative on said actuator for clamping movement of said actuator, said sleeve and said actuator together presenting a first set of surfaces disposed for contact therebetween and consequent clamping movement of said sleeve along said elongated axis and relative to said collet in response to clamping movement of said actuator, said first set of surfaces being disposed at first ones of diametrically opposite sides of said sleeve and arranged for transfer of clamping forces from said actuator to said sleeve, the improvement comprising said sleeve and said actuator having a second set of surfaces at diametrically opposite sides spaced from said first ones of diametrically opposite sides of said sleeve and with said second set of surfaces being disposed in planes parallel to each other and being planar and matched together and arranged for snug engagement therebetween and consequent restraint of said sleeve relative to said actuator to restrict any rotation of said sleeve.

14. The collet clamping mechanism as claimed in claim 13 wherein each of said two parts includes a protruding tang, and said surfaces of said first set of surfaces of said actuator each are on a respective said tang for uniform forcing on said surface of said first set of surfaces on said sleeve.

15. The collet clamping mechanism as claimed in claim 14 wherein said actuator is shaped to present a rectangular space around said sleeve at said second set of surfaces of said sleeve, and said actuator thereby presents rectangularly related surfaces to said sleeve for restraining rotation of said sleeve about said longitudinal axis.

16. The collet clamping mechanism as claimed in claim 13 wherein said actuator parts are shaped to present a rectangular space around said sleeve at said second set of surfaces of said sleeve, and said actuator thereby present rectangularly related surfaces to said sleeve for restraining rotation of said sleeve about said longitudinal axis.

* * * * *

UNITED STATES PATENT AND TRADEMARK OFFICE
CERTIFICATE OF CORRECTION

PATENT NO. : 5,249,815
DATED : October 5, 1993
INVENTOR(S) : Richard F. Beere

It is certified that error appears in the above-identified patent and that said Letters Patent is hereby corrected as shown below:

In column 5, line 29, after "parts" (2nd occurrence) insert --being--.

In column 8, line 14, change "an din" to --and in--.

Signed and Sealed this

Twenty-second Day of March, 1994

Attest:

BRUCE LEHMAN

Attesting Officer

Commissioner of Patents and Trademarks